US012585801B2

(12) United States Patent
Schiffman et al.

(10) Patent No.: US 12,585,801 B2
(45) Date of Patent: Mar. 24, 2026

(54) PRODUCING MESSAGES

(71) Applicant: Hewlett-Packard Development Company, L.P., Spring, TX (US)

(72) Inventors: Joshua Serratelli Schiffman, Bristol (GB); Thalia May Laing, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 18/681,803

(22) PCT Filed: Sep. 1, 2021

(86) PCT No.: PCT/US2021/048756
§ 371 (c)(1),
(2) Date: Feb. 6, 2024

(87) PCT Pub. No.: WO2023/033823
PCT Pub. Date: Mar. 9, 2023

(65) Prior Publication Data
US 2024/0338465 A1     Oct. 10, 2024

(51) Int. Cl.
*G06F 21/60* (2013.01)
*H04L 9/30* (2006.01)
(52) U.S. Cl.
CPC .............. *G06F 21/606* (2013.01); *H04L 9/30* (2013.01)
(58) Field of Classification Search
CPC .................................................. G06F 21/606
See application file for complete search history.

(56) References Cited

U.S. PATENT DOCUMENTS

| | | | |
|---|---|---|---|
| 8,037,290 B1 | 10/2011 | Stutton | |
| 8,826,441 B2 | 9/2014 | Mahaffey et al. | |
| 9,244,862 B2 | 1/2016 | Shaw et al. | |
| 11,108,627 B2 | 8/2021 | Smith et al. | |
| 2002/0046342 A1* | 4/2002 | Elteto | G06F 21/6245 713/185 |

(Continued)

OTHER PUBLICATIONS

"Remote Log collection on Windows and Linux", Manage Engine, available at<https://www.manageengine.com/products/eventlog/remote-log-management.html> Jul. 7, 2021, 8 pages.

(Continued)

*Primary Examiner* — Simon P Kanaan
(74) *Attorney, Agent, or Firm* — Quarles & Brady LLP

(57) ABSTRACT

In an example, apparatus is described. The apparatus comprises a processor associated with a secure interface of the apparatus for managing communications with a communications interface communicatively coupled to the secure interface via a communication path. The apparatus further comprises a non-transitory machine-readable medium storing instructions readable and executable by the processor. The instructions cause the processor to receive, via the secure interface, a request generated by a requesting entity for the apparatus to provide information about a computing system associated with the apparatus. The instructions further cause the processor to, in response to the request, produce a message comprising the information, where the message comprises an indication that the apparatus produced the message.

15 Claims, 6 Drawing Sheets

(56) References Cited

U.S. PATENT DOCUMENTS

| | | | |
|---|---|---|---|
| 2009/0097661 A1* | 4/2009 | Orsini | G06F 21/45 |
| | | | 380/279 |
| 2010/0031047 A1 | 2/2010 | Coker, II et al. | |
| 2016/0119287 A1* | 4/2016 | Khazan | H04W 12/06 |
| | | | 726/12 |
| 2018/0069836 A1 | 3/2018 | Mandyam | |
| 2018/0109561 A1 | 4/2018 | Kegel | |
| 2018/0137512 A1 | 5/2018 | Georgiadis et al. | |
| 2020/0145409 A1 | 5/2020 | Pochuev et al. | |
| 2020/0204988 A1* | 6/2020 | Wirola | H04W 12/63 |

OTHER PUBLICATIONS

"Security Event Log", Science Direct, Jul. 7, 2021, available at <https://www.sciencedirect.com/topics/computer-science/security-event-log> pp. 1-23.

* cited by examiner

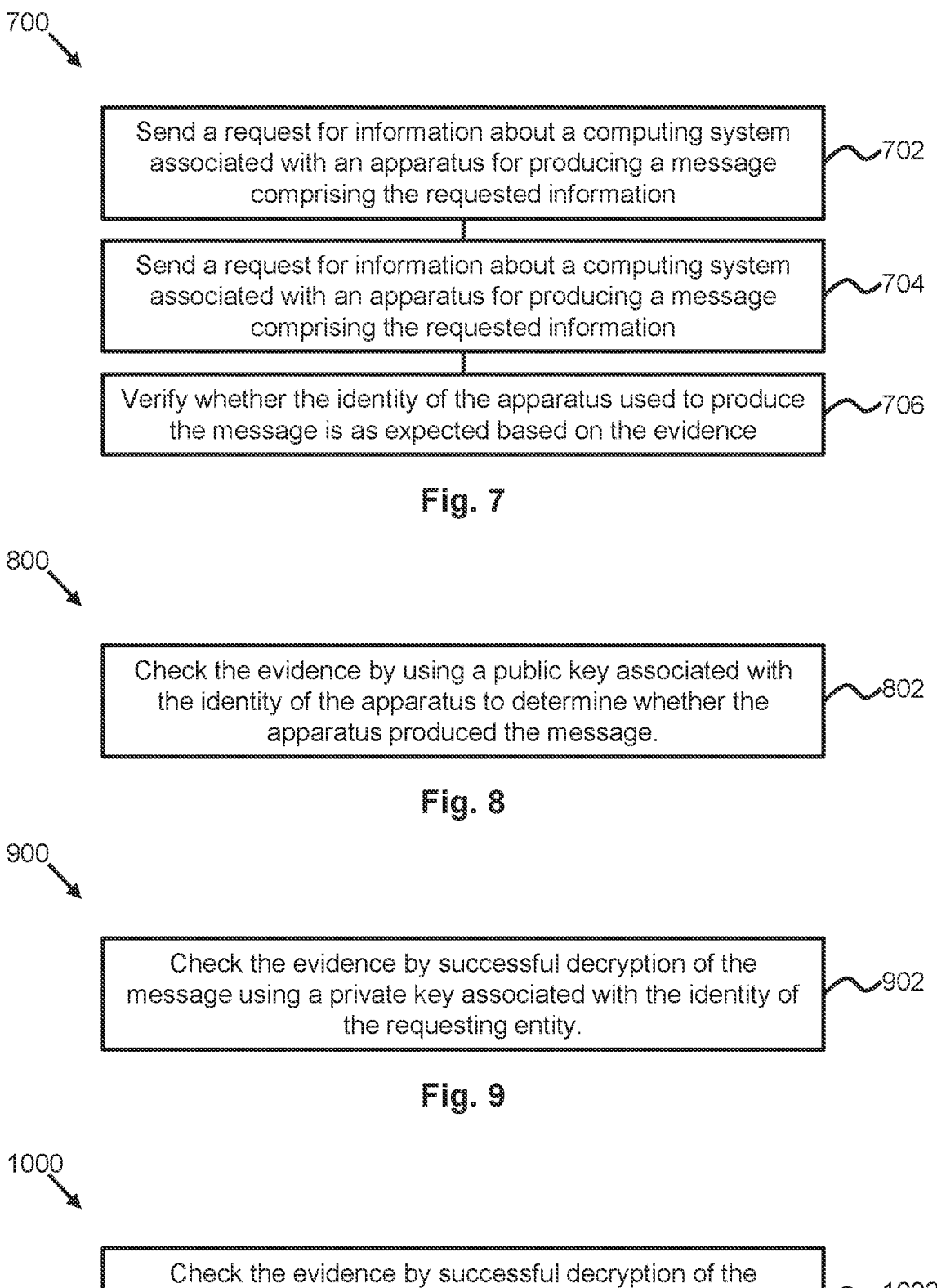

700

Send a request for information about a computing system associated with an apparatus for producing a message comprising the requested information — 702

Send a request for information about a computing system associated with an apparatus for producing a message comprising the requested information — 704

Verify whether the identity of the apparatus used to produce the message is as expected based on the evidence — 706

Check the evidence by using a public key associated with the identity of the apparatus to determine whether the apparatus produced the message. — 802

Check the evidence by successful decryption of the message using a private key associated with the identity of the requesting entity. — 902

Check the evidence by successful decryption of the message using a shared key — 1002

In response to determining that the received message comprises the indication of the time of the request, verify that the message was produced in response to the request. — 1102

1200
Machine-readable medium

1202
Instructions

1204
Processing circuitry

1300
Device

1306
Machine-readable medium

1308
Instructions

1302
Processing circuitry

1304
Interface

PRODUCING MESSAGES

BACKGROUND

A computing system may produce data responsive to events that occur as part of activities within the computing system. Analytic techniques may be used to analyze the behavior of the computing system based on the produced data.

BRIEF DESCRIPTION OF DRAWINGS

Non-limiting examples will now be described with reference to the accompanying drawings, in which:

FIG. 7 is a flowchart of an example method of verifying an apparatus identity;

FIG. 8 is a flowchart of an example method of checking evidence;

FIG. 9 is a flowchart of an example method of checking evidence;

FIG. 10 is a flowchart of an example method of checking evidence;

DETAILED DESCRIPTION

Figure 1:
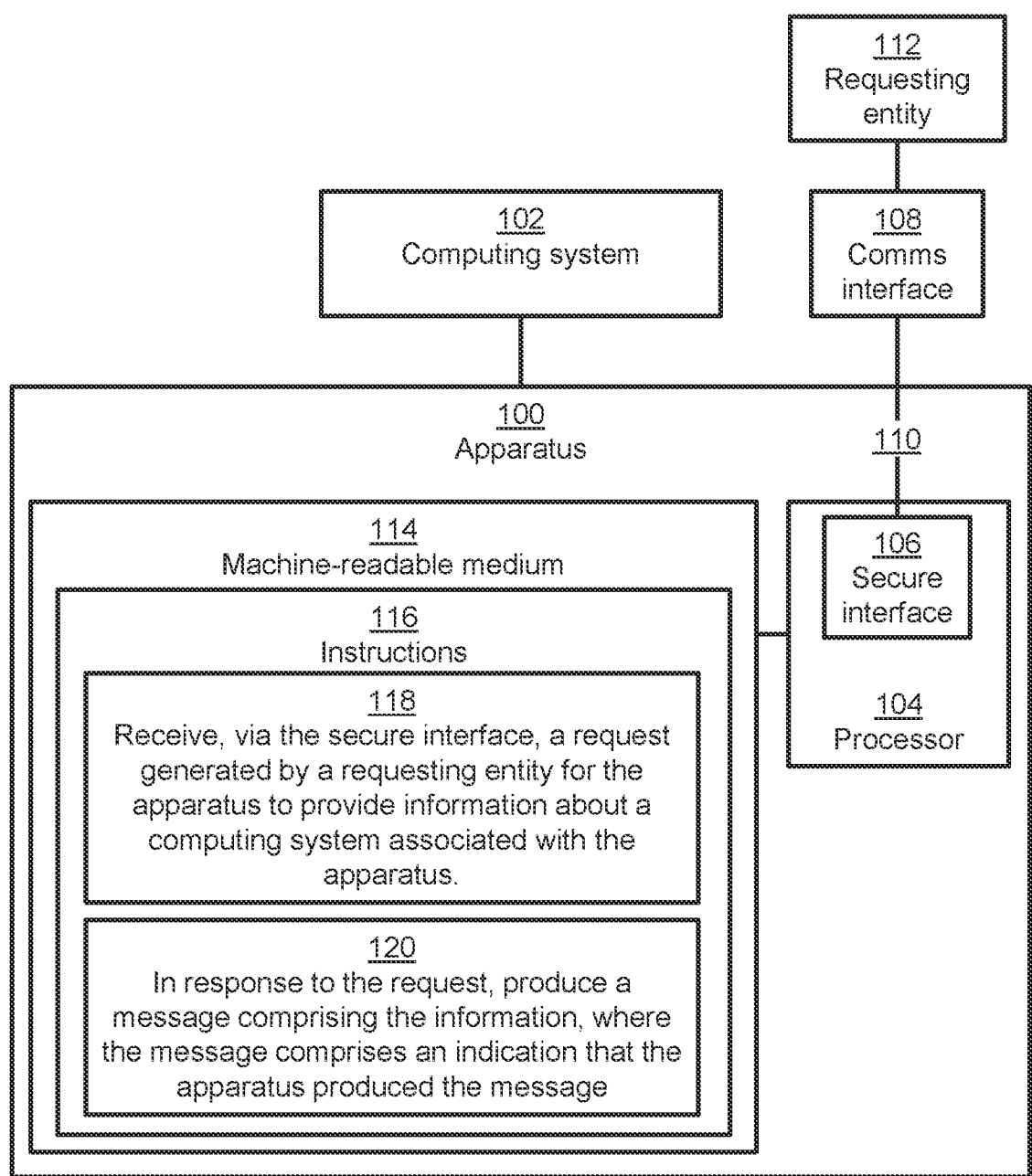
FIG. 1 is a schematic drawing of an example apparatus for producing a message.

A computing system (e.g., implemented by a personal computer, laptop, tablet, phone, embedded system, Internet of Things (IoT) device, printer or computing network comprising a plurality of computing nodes, etc.) may generate information regarding events that occur in the computing system and/or other information about the computing system. For example, such information may be generated as part of, or in response to, activities that occur within the computing system (e.g., where an activity may be associated with at least one event that occurs as part of the activity).

Examples of activities that may occur during use of a computing system include: system booting, user log-in/log-out requests, software updates, admin-controlled changes, connecting to/disconnecting from networks, opening/running/closing of applications, connecting/disconnecting peripherals, sending/receiving identities, sending response requests/receiving indications of responses to such requests, etc. The types of activities that occur may depend on the type of computing system. For example, a computing system such as a personal computer or laptop may have a broad range of functionality with multiple possible activities that may occur during use of the personal computer/laptop (e.g., including the example activities listed above) while an embedded system may have a comparatively restricted range of activities (e.g., related to the intended function of the embedded system itself) that may occur during use of the embedded system.

In some examples, an apparatus (e.g., an apparatus hosted by the computing system itself or an apparatus associated with a computing system such as a computing network comprising a plurality of nodes) may produce or collect a log (such as a record, system log or 'syslog', etc.) comprising information about the computing system. For example, such information about the computing system may be regarding an event that has occurred as part of, or in response to, an activity that occurs within the computing system. In an example, a log may be produced as part of, or in response to, a single event that occurs as part of a single activity within the computing system. In another example, multiple logs may be produced as part of, or in response to, corresponding multiple events that occur as part of a single activity within the computing system. In another example, such information about the computing system may comprise or be indicative of an identity of another (responding) component on the apparatus or computing system and/or whether such a component is responding, etc.

In some examples, a 'message' comprising the log may be sent, by the apparatus, to a third party such as a remote admin or requesting entity.

In some examples, a log may comprise 'identifying information' associated with the computing system. For example, the identifying information may identify a user and/or a component of the computing system itself (e.g., by using a user identifier and/or a component identifier). In some examples, the log may comprise information about an event (e.g., an event code, event description or some other indication of the type of event, a time of the event, etc.). Thus, in some examples, the log may comprise 'information about the computing system', where the information may comprise the 'identifying information' and/or the information about the event itself.

In some examples, the computing system may host the apparatus, which may collect or generate information for a log (e.g., based on an event that occurs within the computing system). In an example, the computing system comprises a web client to facilitate user interaction with a web-based service. The computing system may collect information about the user's activity and the apparatus may produce a log comprising the information. In another example, the computing system comprises an embedded system (e.g., of a printer or Internet of Things (IoT) device, etc.) which produces logs in response to execution of code by the embedded system (e.g., due to events that occur on the embedded system).

In some examples, an apparatus associated with the computing system may collect or generate information for a log based on an event that occurs upstream of the apparatus (e.g., in another node of the computing system). In an example, the apparatus may be implemented by a node of a computing system and may receive information from another node of the computing system (e.g., the web client or embedded system described above) and produce a log based on the received information.

In some examples, a computing system may comprise processing circuitry (e.g., comprising a processor) for executing instructions for implementing certain functionality. For example, a computing system may implement functionality such as executing a subroutine as part of an event that occurs within the computing system, producing a log (e.g., in response to executing the subroutine or in response to receiving information from the computing system indicative of an event that occurs elsewhere in a different node of the computing system), sending a log to another node in the computing system, etc.

In some examples, the computing system produces logs comprising the information (e.g., regarding events that occur on the computing system) and the apparatus collects the corresponding logs. In some examples, the computing system generates information (e.g., in response to events that occur on the computing system) and the apparatus produces corresponding logs based on the generated information.

In some examples, a log may be stored in a memory of an apparatus associated with the computing system such as an End-point Security Controller (EpSC) or another controller and/or may be sent to some other location such as a server (e.g., the log may be sent in a telemetry message (i.e., a 'message' such as described below)). In some examples, an apparatus such as an EpSC may be an independent component of a computing system. The apparatus may be an independent component in that the apparatus may operate independently of the operating system (OS) run by the computing system. In other similar words, processing circuitry such as a central processing unit (CPU) (e.g., of a motherboard) of the computing system may implement the functionality of the OS while the apparatus may operate independently, using different processing circuitry, to the CPU/motherboard. Thus, in some examples, the apparatus may comprise processing circuitry (e.g., a processor) that is a separate, independent, component to the processing circuitry used to run the OS. Apparatus such as an EpSC may perform a security function to ensure correct operation of the computing system in case of any incidents that May change the settings of the computing system (e.g., due to system errors, malware attacks, etc.). An apparatus such as an EpSC may produce and/or collect logs in response to the events that occur within the computing system. In some examples, such logs may be stored on the apparatus, on the computing system and/or sent to a requesting entity such as a remote admin.

In some examples, a log may be stored in a memory of the computing system itself but external to the apparatus. For example, an apparatus such as an EpSC may secure the log (e.g., using a symmetric primitive for which it stores the key, such as by using authenticated encryption e.g., Advanced Encryption Standard with Galois Counter Mode (AES-GCM) or by using a Message Authentication Code (MAC) tag) and then store the secured log in memory external to the EpSC but still on the computing system. Storing the secured log elsewhere on the computing system rather than on the apparatus itself may be useful if the apparatus has memory restrictions.

A set of logs may be collectively indicative of certain information about the computing system such as the performance of the computing system, end-user behavior, suspicious activity, etc. In some examples, logs may be collected directly from computing systems or apparatus or from a networked collector node, for example, a cloud or syslog server.

Data analytics may be implemented to produce alerts, metrics and/or statistics based on the set of logs. Such data may be reviewed, for example by a human operator or an artificial intelligence-based operator, to determine whether or not the computing system is behaving as expected.

Data analytics may refer to a range of data processing techniques and may include machine learning-based techniques. The data analytics may be of varying complexity and may contain various configurable thresholds and parameter choices to filter and manipulate the input data (e.g., logs) to produce an inference about a computing system. Adjusting these choices may result in different analytic output. Some analytical tools may filter and/or aggregate the data collected from a computing system (e.g., comprising a plurality of nodes).

Enterprise information technology and security administrators (e.g., 'remote admin') may actively track activity of a network in an attempt to spot anomalous activity within the network.

Producing Messages

In some examples, a computing system may comprise or be associated with an apparatus such as an End-point Security Controller (EpSC) or other microcontroller. Such apparatus may represent an independent component associated with the computing system, either as part of the computing system itself or otherwise communicatively coupled to the computing system. As noted above, the apparatus may be an independent component in that the apparatus may operate independently of the operating system (OS) run by the computing system. For example, the functionality of the apparatus may be implemented by processing circuitry that is not the CPU of the OS. In some examples, the apparatus may perform security-relevant operations and/or load configuration data that may affect the integrity of the computing system. In some examples, the apparatus may generate and/or store data (e.g., logs) of events (e.g., security-relevant events such as system boots, log-in attempts, password changes, etc.) that may occur during operation of the computing system. A third party such as a remote admin or other requesting entity may wish to collect evidence of such operations or events to verify the correct operation of the computing system's components e.g., as part of ongoing fleet management to detect deviation from a policy, or for auditing and analytics, amongst other purposes.

In some examples, a third party (e.g., a 'requesting entity') such as a remote admin or other requesting entity may receive a message (comprising a log) derived from an apparatus such as the EpSC while the computing system is powered up with a functional operating system (OS) that has a user space application to facilitate sending such a message to the third party. If the computing system is in a powered-down or off state, or if the OS is not functional for another reason (e.g., due to disk corruption or malicious code), the third party may not be able to obtain any logs from the apparatus. Thus, any logs held by or accessible to the apparatus may not be accessible to a third party unless the computing system is on and the OS is functional.

In some examples, a third-party entity such as a device admin or remote admin can retrieve apparatus logs in various ways. In an example, software running on the computing system may periodically collect the logs and push them to a folder, so that they are accessible in the file directory for the third-party entity to view. In some examples, the third-party entity can request logs via a Windows Management Instrument (WMI) call. If the OS is not running, or if the computing system is not powered-up, then an admin may be unable to retrieve and view the apparatus logs.

In some examples, certain devices associated with a computing system may be set up to communicate with a third-party entity autonomously from the OS. For example, such a device may be communicatively coupled to a communications interface (e.g., a communications interface independent of another communication interface associated with the OS or the same communications interface that is associated with the OS) for sending/receiving data via the communications interface. The communications interface may use wireless communications (e.g., using a radio network including cellular (e.g., 4G, 5G, etc.), a wide area network (WAN), a low power WAN (LPWAN), a wireless local area network (WLAN), Wi-Fi, etc., and/or using another wireless technology such as optical communications) for facilitating communications with the third party. Such communications between the device and the third party may be via a network node such as a radio access node (e.g., a base station, Evolved Node B (eNodeB), Next Generation Node B (gNB) etc.) or another type of access node. Examples of communication interfaces for wireless (cellular) communications include: a cellular interface (e.g., a 4G, 5G modem/antenna), a Cat-M device (e.g., associated with Long Term Evolution Machine Type Communication (LTE-MTC)), a Narrow-Band Internet of Things (NB-IoT) device, etc. In some examples, the communications interface may use wired communications (e.g., ethernet). In some examples, the communications interface may comprise a port (e.g., Universal Serial Bus (USB) port, memory slot, etc.) associated with the device and/or computing system for allowing data transfer with a third-party entity (e.g., a peripheral, memory device, etc.) via the port.

By being able to communicate autonomously from the OS, the device may be able to send and/or receive messages to/from a third party without involving the OS. Thus, even if the computing system is in a powered-down or off state, or the OS is otherwise not functional, it may be possible for the device to send messages and/or receive data to/from the third party.

Such 'autonomous' functionality may potentially allow the device to be accessible irrespective of the power state and/or OS state. For example, the device could be accessible anywhere in the world with cellular coverage if the communications interface is set up for cellular communications.

In some examples, access to apparatus such as an EpSC may be mediated by a Basic Input/Output System (BIOS) of the computing system. Thus, the BIOS may provide a level of protection from unauthorized applications and users from accessing the EpSC's data. Further, in some examples, the communication path between the trusted BIOS and the EpSC may be protected by a Hash-based Message Authentical Code (HMAC) authenticated channel established during a secure boot process. Without use of the HMAC authenticated channel (e.g., when the OS is not running), the EpSC may not be able to authenticate who or what is accessing potentially sensitive information and data. Thus, in some examples, where a communication path is mediated by the BIOS, data held or secured by the EpSC may not be accessible via this communication path for security and/or privacy reasons.

This disclosure proposes facilitating third party access to the data held or secured by apparatus such as an EpSC without involving the OS, as described in more detail below.

FIG. 1 is a schematic illustration of an example apparatus 100 for producing a message. In some examples, the apparatus 100 may be implemented by a device such as an EpSC. As represented by the schematic illustration, the apparatus 100 may be independent with respect to other components, systems and/or entities. However, the relationship between the apparatus 100 and the other components, systems and entities may depend on the set-up, as described in more detail below.

The apparatus 100 is associated with a computing system 102. In some examples, the apparatus 100 may be associated with the computing system 102 by virtue of being on the same platform as the computing system 102 (e.g., the computing system 102 may host the apparatus 100). In some examples, the apparatus 100 may be associated with the computing system 102 by virtue of being communicatively coupled to the computing system 102 to generate or collect information about the computing system 102. In either of the examples, the apparatus 100 may be communicatively coupled to the computing system 102, as depicted by FIG. 1.

The apparatus 100 comprises a processor 104 (e.g., processing circuitry) for implementing certain functionality described below. The processor 104 is associated with a secure interface 106 of the apparatus 100 for managing communications with a communications ('comms') interface 108 communicatively coupled to the secure interface 106 via a communication path 110.

In some examples, the secure interface 106 may be implemented in a protected portion of the processor 104 (e.g., to ensure that the processor 104 controls any communications with the communications interface 108). In some examples, the secure interface 106 may implement a protocol to manage data exchange (i.e., control access rights, etc.) with the processor 104. In some examples, the secure interface 106 may be implemented as a secure co-processor (e.g., a secure component, secure enclave, etc.) associated with the processor 104 that implements a security protocol. Any device (including integral or separate components to the processor 104) that functions to control data flow in some way based on a security policy (e.g., a security policy defined by instructions stored in a memory accessible to the device and to be implemented by the device (e.g., by its own processing circuitry and/or by the processor 104 itself)). Thus, the secure interface 106 may or may not be part of the processor 104 itself.

In some examples, the communications interface 108 may be part of a device or computing system 102 that hosts the apparatus 100. In some examples, the communications interface 108 may be dedicated to the apparatus 100 (e.g., the computing system 102 may have its own communications interface). In some examples, the computing system 102 may host the communications interface 108 (i.e., on the same platform). In some examples, the communications interface 108 may be separate to the computing system 102. In some examples, the communications interface 108 may be accessible to other types of apparatus such as a security processor, dependent peripheral, or a collection of subcomponents that could time share resources, etc. Thus, the computing system 102 may or may not use the communications interface 108 (e.g., while the OS is running).

As depicted by FIG. 1, the communication path 110 is between the secure interface 106 and the communications interface 108. The communication path 110 may comprise a bus or any other circuitry to facilitate sending of data via the communication path 110.

In some examples, the communications interface 108 may facilitate communication of data with a requesting entity 112 (e.g., a third party such as a remote admin) using wireless or wired communication, as described above. Other nodes (not shown) that may be associated with such communication (e.g., an eNB or gNB in the case of a 4G/5G-enabled communications interface 108) may be involved in communications between the communications interface 108 and the requesting entity 112 (e.g., there may or may not be a direct communication path therebetween).

Thus, in some examples, communications between the processor 104 and the requesting entity 112 may be via the communication path 110 and may be controlled by the secure interface 106. In some examples, such as when the computing system 102 is powered-on and the OS is functional, the requesting entity 112 may be able to obtain data produced or collected by the processor 102 (e.g., logs) via a different communication path (e.g., from a memory in the computing system 102 and/or via a secure channel with the apparatus 100).

Further details of the example apparatus 100 are described below.

The apparatus 100 further comprises a non-transitory machine-readable medium 114 storing instructions 116 readable and executable by the processor 104 to cause the processor 104 to implement certain functionality according to the instructions described below.

In this regard, the instructions 116 comprise instructions 118 to receive, via the secure interface 106, a request generated by the requesting entity 112 for the apparatus 100 to provide information about the computing system 102.

The instructions 116 comprise further instructions 120 to, in response to the request, produce a message comprising the information. The message comprises an indication that the apparatus 100 produced the message. Examples of such an indication are described in more detail herein.

In some examples, the 'indication' may provide a way for the requesting entity 112 to determine that the apparatus 100 (and not another apparatus with another identity) produced the message. Thus, the indication may provide a way for the requesting entity 112 to authenticate the message, and thus authenticate the information in the message so that the requesting entity 112 may have confidence that the information is associated with the computing system 102 and/or that the message comprising the information was produced/sent by the apparatus 100.

In some examples, the apparatus 100 may be capable of communicating data with the requesting entity 112 via the communication path 110 in such a way that does not involve the OS (of the computing system 102). The requesting entity 112 may be able to obtain information about the computing system 102 (e.g., including events that have occurred on the computing system, configuration data, errors, etc.) even if the computing system 102 has no power and/or is unable to boot.

Since, in some examples, the communication path 110 can be used without involvement of the OS (e.g., since the apparatus 100 is an independent component with respect to the processing circuitry used to run the OS), further functionality may be enabled by use of the communications interface 108. Certain types of communications interface 108 such as CAT-M devices may provide a way to communicate with the apparatus 100 (e.g., to request/obtain information about the computing system 102) without powering-on the computing system 102 and/or involving the OS of the communication system 102. In some examples, the apparatus 100 comprises an EpSC. In some examples, other types of apparatus associated with the computing system 102 such as a security processor, a dependent peripheral, or a collection of subcomponents that could time share resources, etc., may be able to use the communications interface 108 independently of the OS.

Various management scenarios may be facilitated based on the functionality and capabilities of the apparatus 100. For example, the trustworthiness of the computing system 102 may be assessed in the field (e.g., prior to booting, after shut-down and/or at any point during distribution/servicing/repair of the computing system 102 such as when the computing system 102 changes hands). Thus, in some examples, the requesting entity 112 may be able to detect changes to the computing system 102 (e.g., if a communications network is available for use by the communications interface 108) that may be relevant from a performance and/or security perspective.

In some examples, technologies such as CAT-M radio connectivity may facilitate IoT-type functionality in a computing system 102 such as a laptop or other computing device. Such a computing system 102 can be monitored, set-up and/or diagnosed remotely in a secure and safe manner. Such technology may provide the basis for multiple types of security set-ups and supply chain scenarios like system verification during procurement and intake. Technologies such as CAT-M radio (and other communications technologies such as described above) may facilitate communications with apparatus 100 such as an EpSC even if the OS on the computing system 102 is not running or functioning correctly, or if the computing system 102 does not have power. In some examples, if there is an independent communications interface 108 for the apparatus 100 to facilitate access to the data stored in or accessible to the apparatus 100 (e.g., logs), such data may be accessible even if another communications interface (not shown) associated with the OS running on the computing system 102 is not useable (e.g., due to a malfunction, communication network issues, etc.). Thus, even if the OS is operational and functioning correctly, an independent communications interface 108 may provide a 'back-up' option for allowing the requesting entity 112 access to the data.

Figure 2:
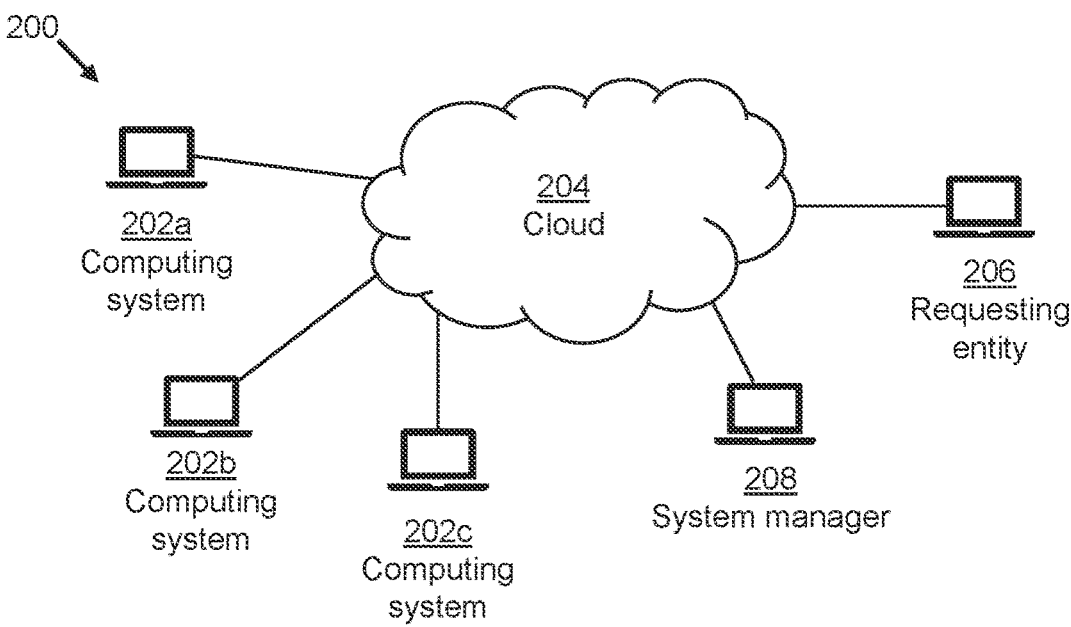
FIG. 2 is a schematic drawing of an example architecture for implementing certain methods, machine-readable media and apparatus described herein.

FIG. 2 is a schematic drawing of an example architecture 200 for implementing certain methods, machine-readable media and apparatus described herein. Reference is made to certain features of the example apparatus 100 and associated entities described in relation to FIG. 1.

The example architecture 200 comprises a plurality of computing systems 202a, 202b, 202c. Each computing system 202a-c may comprise an apparatus 100 (not shown in FIG. 2) such as referred to in FIG. 1. The computing systems 202a-c are communicatively coupled to a cloud 204. A third party (i.e., a 'requesting entity' 206) is also communicatively coupled to the cloud 204. The requesting entity 206 receives messages (e.g., logs) comprising information about the computing systems 202a-c. The architecture 200 further comprises a system manager 208 for managing the architecture 200 (e.g., registering the computing systems 202a-c and/or requesting entity 206 to the architecture 200, facilitating certain examples described herein such as facilitating key exchange between the different entities, authorizing the requesting entity 206, managing permissions, etc.). According to certain examples described herein (e.g., FIG. 1 and other examples described below), the requesting entity 206 may be able to access information stored or accessible to the apparatus 100 associated with each computing system 202a-c via a channel (e.g., communication path 110) that is independent of the OS associated with the computing systems 202a-c. That is, each computing system 202a-c is associated with an apparatus 100, which is itself associated with a communications interface 108 via the channel. Thus, the requesting entity 206 may be able to determine, from the messages it receives, information regarding the computing systems 202*a-c* and authenticate which apparatus 100 (and which associated computing system 202*a-c*) produced the message.

Different architectures are possible. For example, the link between the computing systems 202*a-c* and the requesting entity 206 may be via a server instead of cloud 204. In some cases, the apparatus 100 may be a separate entity to the computing systems 202*a-c*. For example, the apparatus 100 may be communicatively coupled to a computing system 202*a-c* (e.g., comprising one or a plurality of nodes). An example may be where the apparatus 100 is implemented as a networked data collector that collects data from a plurality of nodes (i.e., computing systems 202*a-c*) communicatively coupled to the apparatus 100. In some examples, the computing systems 202*a*, 202*b*, 202*c* could be part of the same network (e.g., associated with the same organization) or could be part of different networks. As shown in FIG. 2, each computing system 202*a*, 202*b*, 202*c* is represented as an individual computing node. In some examples, a computing system 202*a*, 202*b*, 202*c* may comprise a plurality of computing nodes (e.g., each computing system 202*a-c* may represent a network of computing nodes where each computing node is implemented by a different device). In some examples, the requesting entity 206 is a separate entity to the system manager 208. For example, the requesting entity 206 may be implemented by an admin of the computing systems 202*a-c*. In some examples, the system manager 208 may set up/initialize the architecture 200 or may authorize the requesting entity 206 to set up/initialize the architecture 200 (e.g., register computing systems 202*a-c*, exchange keys, etc.). In some examples, the requesting entity 206 and the system manager 208 are implemented by the same entity. In some examples, an entity (implemented by the requesting entity 206 and/or the system manager 208) such as a data analytics service provider may collect logs as part of providing the data analytics service.

Figure 3:
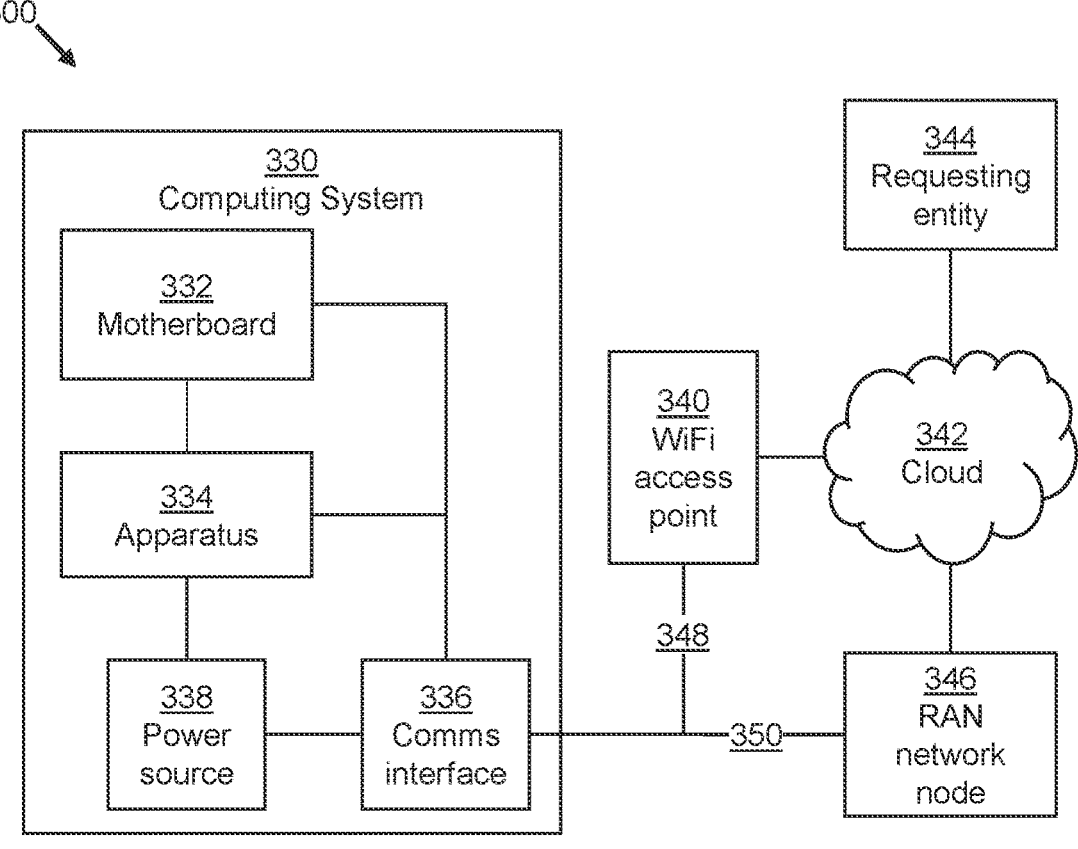
FIG. 3 is a schematic drawing of an example system for implementing certain methods, machine-readable media and apparatus described herein.

FIG. 3 is a schematic drawing of an example system 300 for implementing certain methods, machine-readable media and apparatus described herein. Reference is made to certain features of the example apparatus 100 and associated entities described in relation to FIG. 1, as well as parts of the example architecture 200 referred to in FIG. 2. FIG. 3 represents an example set-up for the apparatus 100/computing system 102 and communication networks for facilitating communications between the apparatus 100/computing system 102 and the requesting entity 112. Although different reference signs are used to avoid conflict with FIGS. 1 and 2, any entities/components referred to in FIG. 3 that are also referred to in FIGS. 1 and/or 2 may have the same or similar functionality.

The example system 300 comprises a computing system 330.

The computing system 330 comprises a motherboard 332 (e.g., comprising or communicatively coupled to various components that are not shown such as a central processing unit, random access memory, the BIOS, channels for communicating with other components of the computing system 330, etc.) for executing the functionality of the OS.

The computing system 330 further comprises an apparatus 334 (e.g., corresponding to the example apparatus described herein such as apparatus 100). As depicted by FIG. 3, the apparatus 334 is an independent component with respect to the motherboard 332 (which is used to run the OS).

The computing system 330 further comprises a communications interface 336 (e.g., corresponding to the example communications interface 108). The communications interface 336 may be set-up for various communication protocols. In this example, the communications interface 336 is capable of communicating wirelessly using Wi-Fi™ and cellular (and comprises an appropriate device such as a wireless adapter for facilitating such communication types e.g., via a Wi-Fi interface and a cellular interface (e.g., a CAT-M device, 4G/5G chip, etc.)). However, other communication protocols may be used instead of or as well as described above. In this example, both the motherboard 332 and apparatus 334 are shown as being communicatively coupled to the communications interface 336. In some examples, each of the motherboard 332 and apparatus 334 may be capable of communicating via any of the wireless devices/chips associated with the communications interface 336. In some examples, the motherboard 332 and apparatus 334 may be capable of communicating via different wireless devices/chips associated with the communications interface 336 (for example, the motherboard 332 may be capable of communicating via any of the wireless devices/chips while the apparatus 334 may be capable of communicating via a cellular interface of the communications interface 334 instead of other types of wireless devices/chips).

Thus, in this example system 300, the computing system 330 hosts the apparatus 334 and the communications interface 336.

The computing system 330 further comprises a power source 338 (e.g., a battery) that may be independent of a power source (not shown) such as another battery and/or mains power used by the motherboard 332 to run the OS. The power source 338 may therefore allow the apparatus 334 and communications interface 336 to implement certain functionality even if the OS is not running and/or power is not available for the motherboard 332. In some examples, the apparatus 334 may itself have its own power source for use in implementing certain examples described herein.

During use of the OS, the OS may cause data to be sent/received to/from the internet via the communications interface 336. In this example, the OS may communicate with the internet using a Wi-Fi connection via a Wi-Fi access point 340 (e.g., a Wi-Fi router). In some examples, the Wi-Fi access point 340 may be communicatively coupled to cloud 342 (or a server or other service) in order to facilitate internet communications. The system 300 further comprises a requesting entity 344 (e.g., corresponding to requesting entity 112) communicatively coupled to the cloud 342. While the OS is operational, the requesting entity 344 may receive data (e.g., logs) stored by or accessible to the apparatus 334 via the Wi-Fi connection.

The system 300 further comprises a radio access network (RAN) network node 346 for facilitating cellular communications (e.g., 4G/5G, etc.). The RAN network node 346 is also communicatively coupled to the cloud 342, and hence also communicatively coupled to the requesting entity 344.

Therefore, in this example, the requesting entity 344 has two possible ways to communicate with the computing system 330. In a first way, the requesting entity 344 may communicate via a first communication path 348 comprising the Wi-Fi connection (e.g., while the OS is running). In a second way, the requesting entity 344 may communicate via a second communication path 350 (e.g., comprising communication path 110) comprising a cellular connection (e.g., if the OS is not running). Thus, the requesting entity 334 may be able to communicate with the apparatus 100 directly without involvement of the OS using e.g., cellular or another communication protocol facilitated by the communications interface 336.

Some examples relating to certain example apparatus (e.g., apparatus 100, 300) are described below. Reference is therefore made to components or entities of FIG. 1 or 3, where appropriate.

In some examples, the apparatus 100, 334 is accessible to an operating system of the computing system 102,330. In use of the apparatus 100, 334, the communication path (e.g., the second communication path 350) is to permit (e.g., facilitate) sending and/or receiving of communications independently of the operating system.

In some examples, if the computing system 102, 330 is in a powered-down state (e.g., off or low power), the apparatus 100, 334 is to access a power source (e.g., power source 338 or another power source) to power-on the apparatus 100, 334 while the computing system 102, 330 is in the powered-down state and permit sending and/or receiving of communications via the communication path (e.g., the second communication path 350).

A description is now given regarding an example set-up of the architecture 200 and/or system 300 with reference to the components/entities mentioned above. In addition, an example way that the message provided by the apparatus 100 may indicate that the apparatus 100 produced the message is described below.

Initialization of the set-up, data collection using the set-up and encryption capabilities are described below.

Initialization of the set-up may occur once, possibly in a secure environment such as the factory that manufactures the apparatus 100, 334 and/or computing system 102, 330. During initialization, the apparatus 100, 334 (e.g., an EpSC) and the requesting entity 112, 206, 344 may generate signing keys and exchange public keys e.g., in a secure manner to facilitate authentication of future communications. As noted above, the system manager 208 may facilitate the key exchange for initialization of the architecture 200. As also noted above, the requesting entity 112, 206, 344 and the system manager 208 may or may not be implemented by the same entity. The following description refers to the functionality of the requesting entity 112, 206, 344 (as may be implemented by a separate entity to the system manager 208 or may be implemented by the system manager 208 itself).

In some examples, the apparatus 100, 334 has an associated asymmetric key pair, (e.g., public key, Epk, and private (secret) key, Esk). The apparatus 100, 334 privately stores Esk (e.g., in an on-board memory or a secure memory elsewhere on the computing system 102,330) and outputs the Epk to the requesting entity 112, 206, 344 (to be stored for later use).

The key pair may be generated in a number of ways. In some examples, the key pair may be generated by the apparatus 100, 334 itself, with the Epk being output in a secure environment and then certified (e.g., by a certificate authority). In some examples, the key pair may be generated by a trusted entity, certified by the trusted entity, and then installed on the apparatus 100, 334.

In some examples, the requesting entity 112, 206, 344 generates an asymmetric signing key pair (e.g., public key, Mpk, and private (secret) key, Msk) and sends the Mpk to the apparatus 100, 334 (to be stored for later use) and privately stores the Msk.

The Mpk may be sent to the apparatus 100, 334 in a number of ways. In some examples, Mpk may be sent directly to the apparatus 100, 334 (e.g., in a trust on first boot setting). In some examples, Mpk may be certified by a certificate authority and/or a trusted entity. In some examples, Mpk may be sent from the requesting entity 112, 206, 344 to a trusted entity, who then installs it on (e.g., securely stores it on or so as be accessible to) the apparatus 100, 334.

At the end of initialization, the apparatus 100, 334 privately stores Esk, and has a trusted, locally stored copy of Mpk. The requesting entity 112, 206, 344 privately stores Msk and has a trusted locally stored copy of Epk.

The collection of logs (i.e., receipt of messages comprising information about the computing system 102, 330) may occur at various points during distribution of the computing system 102, 330. The collection of logs may occur if the computing system 102, 330 changes hands, while the OS is running, if the computing system 102, 330 is shut down or the OS is not functional, etc. Certain examples described herein may facilitate collection of logs via a different communication path to the OS.

In some examples, if the requesting entity 112, 206, 344 wants to request access to the logs, for example, to make a decision on the trustworthiness of the computing system 102, 330 or for general management of the computing system 102, 330, the requesting entity 112, 206, 344 may perform certain actions such as the following.

The requesting entity 112, 206, 344 may construct a 'log request command' (i.e., a 'request') to be sent to the apparatus 100, 334. The log request command may contain information such as the following: a request for log information, a specification of which logs are requested (e.g., 'all logs stored on the apparatus 100, 334', or 'all events stored in the log since last requested'), or information such as 'how many events are in the log', or 'how many new events occurred since last requested'. In some examples, an indication of the time of the request (such as a nonce) may be included in the request to allow the requesting entity 112, 206, 344 to later verify the response (i.e., received message) as fresh.

The requesting entity 112, 206, 344 may then sign the request with Msk, to enable the apparatus 100, 334 to verify that the request comes from the requesting entity 112, 206, 344.

Over the cellular network (e.g., via CAT-M1 radio), the requesting entity 112, 206, 344 may send the signed log request to the apparatus 100, 334.

The apparatus 100, 334 may receive the request, and verify the signature on the log request command using the locally stored Mpk.

If the signature is valid, the apparatus 100, 334 may proceed to execute its response to the request. Otherwise, if the signature is invalid, the apparatus 100, 334 may ignore the request.

After authenticating the log request command, the apparatus 100, 334 may act on the command and generate a message to be sent via e.g., the cellular network.

The message may comprise the information as requested (such as the entries in the log, the number of log entries, etc.).

In some examples, the message comprises a signature (applied by the apparatus 100, 334 using Esk) over the information. In some examples, the signature is applied over: (e.g., a hash of) the requested information (or 'output' of the apparatus 100, 334) and, if present, a nonce provided by the requesting entity 112, 206, 344.

The requesting entity 112, 206, 344 may receive the message and use their local copy of Epk to verify the signature on the information sent (and, if present, the nonce).

If the signature is correct, the requesting entity 112, 206, 344 may have confidence that the data received is authentic and can use the information for its intended purpose (e.g., evaluating trustworthiness of the apparatus/computing system, management, analytics, auditing, etc.)

In this example, the 'signature' is an example of the 'indication' referred to in relation to the apparatus 100. That is, the signature provides an indication of the apparatus 100 that produced the message since it is signed by Esk, which the requesting entity 112, 206, 344 can verify using Epk.

Figure 4:
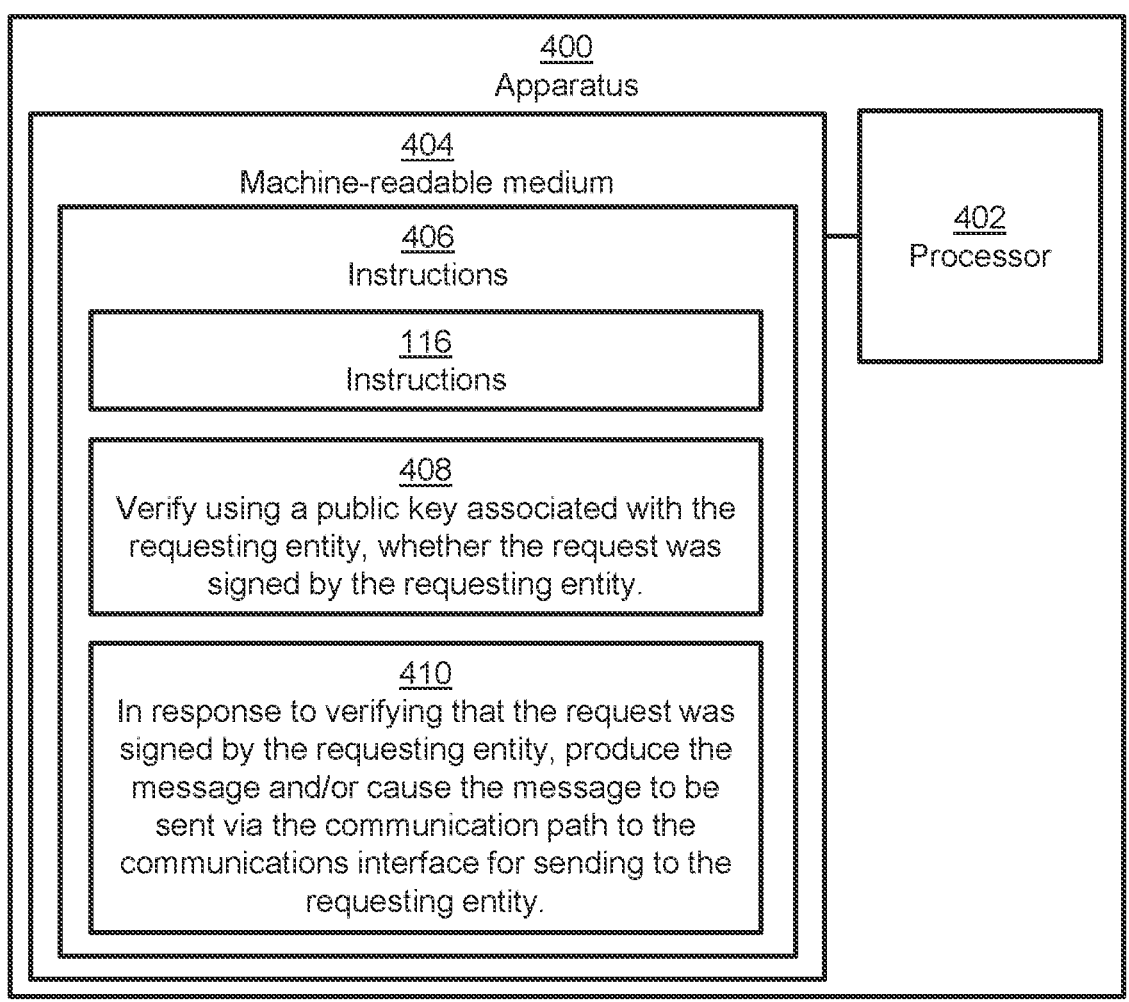
FIG. 4 is a schematic drawing of an example apparatus for verifying and responding to a request.

FIG. 4 is a schematic drawing of an example apparatus 400 for verifying and responding to a request. In some examples, the apparatus 400 may be implemented by a device such as an EpSC. The apparatus 400 may implement certain examples of the 'indication' being in the form of a signature over the message output, as described above.

The apparatus 400 comprises a processor 402 and a non-transitory machine-readable medium 404 storing instructions 406 readable and executable by the processor 402 to cause the processor 402 to implement the functionality described below. Certain instructions included in the instructions 406 may be omitted or performed in a different order to that depicted by FIG. 4.

In this example, the apparatus 400 implements the functionality of the apparatus 100 of FIG. 1. In this regard, the instructions 406 further comprise the instructions 116 of FIG. 1. Various components/entities shown in relation to FIG. 1 are not shown for brevity although reference may be made to any of the previous figures in the description of the apparatus 400.

In some examples, the instructions 406 comprise further instructions 408 to cause the processor 402 to verify, using a public key (e.g., Mpk) associated with the requesting entity 112, whether the request was signed by the requesting entity 112 (e.g., using the requesting entity's 112 private key, i.e., Msk).

In some examples, the instructions 406 comprise further instructions 410 to cause the processor 402 to, in response to verifying that the request was signed by the requesting entity 112, produce the message and/or cause the message to be sent via the communication path (e.g., communication path 110) to the communications interface 108 for sending to the requesting entity 112.

In some examples, the indication comprises a signature applied, by the apparatus 400 using a private key (e.g., Esk) associated with the apparatus 400, to an output of the apparatus 400 comprising the message (e.g., a hash of the requested information).

In some examples, the application of the signature may occur in response to the apparatus 400 verifying the request. In some examples, the application of the signature may occur without the apparatus 400 verifying the request (e.g., the apparatus 400 may proceed to apply a signature to the message without performing verification in accordance with the instructions 408). For example, the apparatus 400 may already trust that the request came from a trusted entity.

Certain encryption capabilities associated with certain examples are now described.

In some examples, the requesting entity 112, 206, 344 may not want the apparatus 100, 334, 400 to send the log information in plaintext over the communication channel for security and/or privacy reasons. Thus, the apparatus 100, 334, 400 may at least partially encrypt the data that is sent to the requesting entity 112, 206, 344. A confidential channel between the apparatus 100, 334, 400 and the requesting entity 112, 206, 344 may be established in a number of different ways.

In some examples, during initialization, the requesting entity 112, 206, 344 and the apparatus 100, 334, 400 may have a symmetric key. This symmetric key (or 'shared key')

could be generated by the requesting entity 112, 206, 344 (or a trusted entity) and installed to the apparatus 100, 334, 400 during manufacture or generated and output by the apparatus 100, 334, 400 in a secure environment. In some examples, this symmetric key may also be used by the requesting entity 112, 206, 344 to encrypt data that is sent to the apparatus 100, 334, 400.

In some examples, the apparatus 100, 334, 400 may establish a first asymmetric key pair to be used for signing the message.

In some examples, the requesting entity 112, 206, 344 may establish a second asymmetric key pair to be used for (e.g., hybrid) encryption. In some examples, the requesting entity 112, 206, 344 may send the encryption public key to the apparatus 100, 334, 400 during initialization. In some examples, the requesting entity 112, 206, 344 may use their signing key, Mpk, to certify the public encryption key at a later date. In this case, the requesting entity 112, 206, 344 may update their public key Mpk as frequently as needed.

In some examples, the requesting entity 112, 206, 344 may establish a second asymmetric key pair, and the apparatus 100, 334, 400 may also establish a second asymmetric key pair (as before, this may be done during initialization or the different entities may use their signing keys to certify/authenticate their encryption keys). These keys may then be used for secure key establishment, such as via a Diffie-Hellman key exchange. In some examples, such a key may also be used for the requesting entity 112, 206, 344 to encrypt data to the EpSC.

As noted above, there are various ways to provide the 'indication' that the apparatus 100, 334, 400 produced the message and/or that the information in the message is derived from an associated computing system. Some further examples of how to provide the indication are described below.

In some examples, the indication comprises at least part of the message encrypted using a key (e.g., a public key or a shared key) associated with the apparatus 100, 334, 400 and/or the requesting entity 112. As noted above, asymmetric and/or symmetric keys may be established in various ways. The public/shared portions of such keys may be used to encrypt/decrypt the message, which may implicitly provide the indication (i.e., via the encrypted part of the message).

In some examples, if the requesting entity 112 is able to decrypt the message, the requesting entity 112 may establish that a certain key was used to encrypt the message. If the key has been securely shared previously or if the message was encrypted using the requesting entity's 112 public key (e.g., if securely exchanged), then the encrypted message may be indicative of the identity of the apparatus 100, 334, 400 that encrypted the message.

In some examples, if the request sent by the requesting entity 112 is encrypted using a key securely shared previously or using the apparatus' 100, 334, 400 public key, and if the apparatus 100, 334, 400 sends the message, this may imply that the apparatus 100, 334, 400 successfully decrypted the request, hence implying the identity of the apparatus 100, 334, 400.

Figure 5:
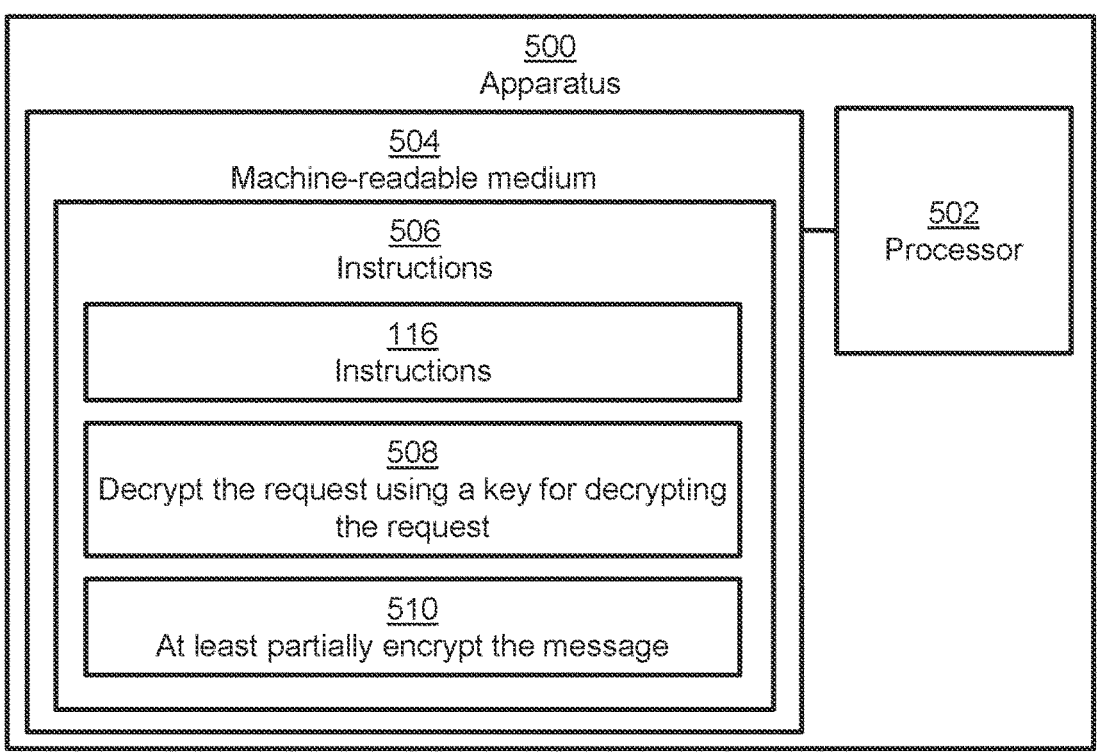
FIG. 5 is a schematic drawing of an example apparatus for decrypting a request and/or encrypting data.

FIG. 5 is a schematic drawing of an example apparatus 500 for decrypting a request and/or encrypting data. In some examples, the apparatus 500 may be implemented by a device such as an EpSC. The apparatus 500 may implement certain examples described above relating to decrypting the request and/or encrypting data.

The apparatus 500 comprises a processor 502 and a non-transitory machine-readable medium 504 storing instructions 506 readable and executable by the processor 502 to cause the processor 500 to implement the functionality described below. Certain instructions included in the instructions 506 may be omitted or performed in a different order to that depicted by FIG. 5.

In this example, the apparatus 500 implements the functionality of the apparatus 100 of FIG. 1. In this regard, the instructions 506 further comprise the instructions 116 of FIG. 1. Various components/entities shown in relation to FIG. 1 are not shown for brevity although reference may be made to any of the previous figures in the description of the apparatus 500.

In some examples, where the request is at least partially encrypted, the instructions 506 comprise further instructions 508 to cause the processor 502 to decrypt the request using a key for decrypting the request. For example, the request could be encrypted using a shared key or the apparatus' 100, 334, 400 public key and the request may then be decrypted, in accordance with the instructions 508, using the shared key or the apparatus' 100, 334, 400 private key.

In some examples, the instructions 506 comprise further instructions 510 to cause the processor 502 to at least partially encrypt the message. For example, the message may be encrypted by using a shared key or the requesting entity's 112 public key.

In some examples, the apparatus 100, 334, 400, 500 may implement the functionality described in relation to any method or machine-readable medium described herein (or any other examples described herein) and/or facilitate any functionality in relation to other entities such as the requesting entity 112, 206, 344 as described above and/or in relation to the example methods described below.

Figure 6:
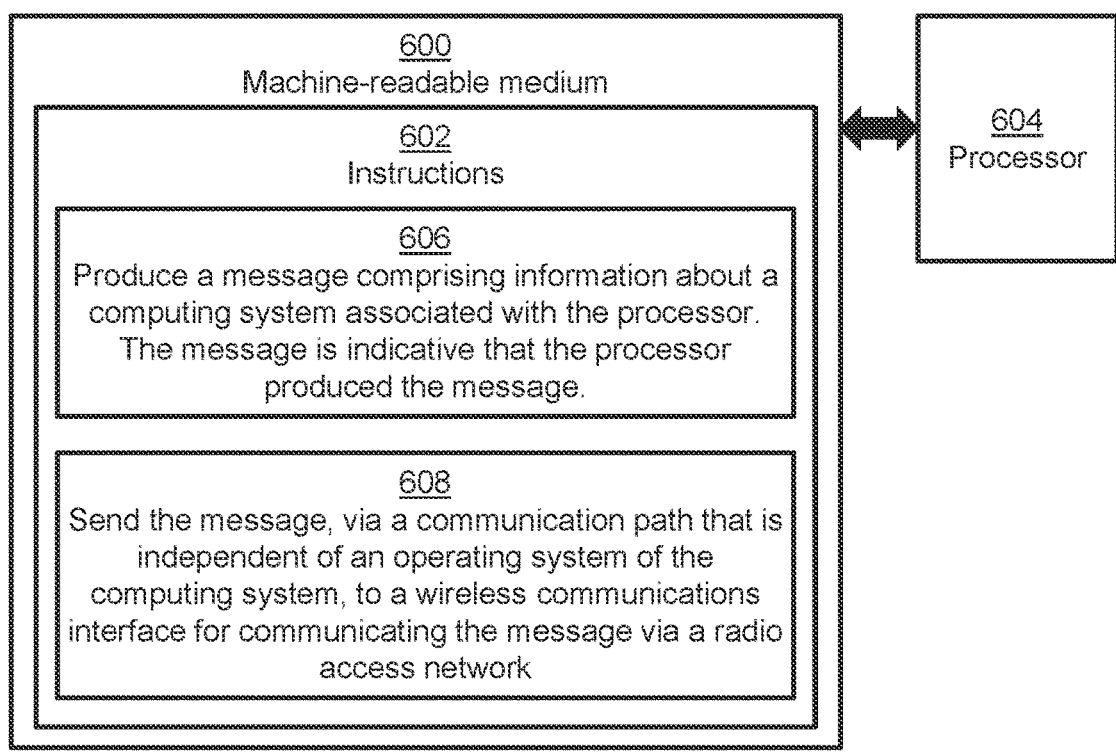
FIG. 6 is a simplified schematic drawing of an example machine-readable medium for producing and sending a message.

FIG. 6 schematically illustrates an example machine-readable medium 600 (e.g., a non-transitory machine-readable medium) which stores instructions 602 which, when executed by a processor 604 (e.g., 'processing circuitry'), cause the processor 604 to facilitate the implementation of certain apparatus described herein (e.g., apparatus 100, 334, 400). In some examples, the machine-readable medium 600 may be installed on or otherwise accessible to an apparatus 100, 334, 400 such as an EpSC (e.g., comprising the processor 604). Reference is made to certain previous figures in the description of the machine-readable medium 600.

In this example, the instructions 602 readable and executable by the processor 604 are to cause the processor 604 to implement the functionality defined by the following instructions.

The instructions 602 comprise further instructions 606 to cause the processor 604 to produce a message comprising information about a computing system 102 associated with the processor 604. The message is indicative that the processor 604 produced the message. This may refer to the 'indication' described above so that the message may allow the requesting entity 112 to verify the processor 604 produced the message.

The instructions 602 comprise further instructions 608 to cause the processor 604 to send the message, via a communication path (e.g., communication path 110, 350) that is independent of an operating system of the computing system 102, to a (e.g., wireless) communications interface 108 for communicating the message via a radio access network 346.

In some examples, the example machine-readable medium 600 may implement the functionality described in relation to any of the example apparatus 100, 334, 400, 500 (or other examples described herein) and/or facilitate any functionality in relation to other entities such as the request-ing entity 112, 206, 344 as described above and/or in relation to the example methods described below.

FIG. 7 is a flowchart of an example method 700 of verifying an apparatus identity. The method 700 may be implemented by a requesting entity such as described above. The method 700 may be computer implemented (e.g., using processing circuitry associated with the requesting entity to cause the method 700 to be executed). Reference is made to certain entities in the previous figures in the description of method 700.

The method 700 comprises, at block 702, sending a request for information about a computing system 102, 300 associated with an apparatus 100, 334 for producing a message comprising the requested information.

The method 700 further comprises, at block 704, receiving the message, sent from the apparatus 100, 334 via a communication path 110, 350 that is independent of an operating system of the computing system 102, 300. The message comprises evidence of an identity of the apparatus 100, 334 used to produce the message. The 'evidence of the identity' may refer to the 'indication' described above.

The method 700 further comprises, at block 704, verifying whether the identity of the apparatus 100, 334 used to produce the message is as expected based on the evidence.

Various examples of how the requesting entity may verify which apparatus 100, 334 produced the message are described above. The message may be 'as expected based on the evidence', for example, if the message is signed using the apparatus' 100, 334 private key, if the existence of the message indicates that the apparatus' 100, 334 successfully decrypted the request sent at block 702 and/or if the message can be decrypted. In some examples, the evidence may be manifested if a key held by the requesting entity verifies a signature and/or decrypts the message. In some examples, a combination of these techniques (e.g., existence of the message, signature verification and/or decryption) may be used to provide the 'evidence of the identity'.

A description of examples relating to the method 700 are described below.

FIG. 8 is a flowchart of an example method 800 of checking evidence. The method 800 may be implemented by a requesting entity such as described above. The method 800 may be computer implemented (e.g., using processing circuitry associated with the requesting entity to cause the method 800 to be executed). Reference is made to certain entities in the previous figures in the description of method 800. The method 800 may comprise or be implemented in conjunction with the method 700.

Where the evidence comprises a signature applied to the message by the apparatus 100, 334 and where the signature is indicative of the identity of the apparatus 100, 334 used to produce the message, the method 800 comprises, at block 802, checking the evidence by using a public key (e.g., Epk) associated with the identity of the apparatus 100, 334 to determine whether the apparatus 100, 334 produced the message. In other words, the public key is used as part of a signature verification procedure to implement the method 800.

FIG. 9 is a flowchart of an example method 900 of checking evidence. The method 900 may be implemented by a requesting entity such as described above. The method 900 may be computer implemented (e.g., using processing circuitry associated with the requesting entity to cause the method 900 to be executed). Reference is made to certain entities in the previous figures in the description of method 900. The method 900 may comprise or be implemented in conjunction with the method 700.

Where the evidence comprises at least partial encryption of the message using a public key (e.g., Mpk) associated with an identity of a requesting entity 112 used to generate the request, the method 900 comprises, at block 902, checking the evidence by successful decryption of the message using a private key (e.g., Msk) associated with the identity of the requesting entity 112.

FIG. 10 is a flowchart of an example method 1000 of checking evidence. The method 1000 may be implemented by a requesting entity such as described above. The method 1000 may be computer implemented (e.g., using processing circuitry associated with the requesting entity to cause the method 1000 to be executed). Reference is made to certain entities in the previous figures in the description of method 1000. The method 1000 may comprise or be implemented in conjunction with the method 700.

Where the evidence comprises at least partial encryption of the message using a shared key associated with the apparatus 100, 334 used to produce the message and a requesting entity 112 used to generate the request, the method 1000 comprises, at block 1002, checking the evidence by successful decryption of the message using the shared key.

Further examples relating to the methods 700, 800, 900 and/or 1000 are described below.

In some examples, the request is at least partially encrypted, and the 'evidence' comprises existence of the received message indicating that the apparatus 100, 334 successfully decrypted the request.

In some examples, the request is at least partially encrypted using a shared key associated with the apparatus 100, 334 and a requesting entity 112 used to generate the request. In some examples, the request is at least partially encrypted using a public key associated with the identity of the apparatus 100, 334.

Figure 11:
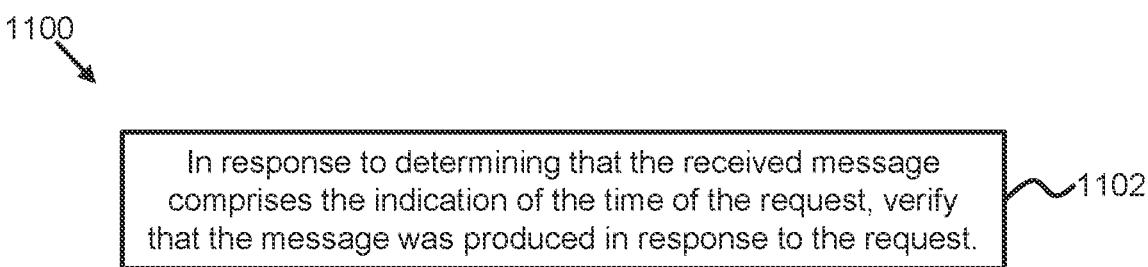
FIG. 11 is a flowchart of an example method of verifying a message.

FIG. 11 is a flowchart of an example method 1100 of verifying a message. The method 1100 may be implemented by a requesting entity such as described above. The method 1100 may be computer implemented (e.g., using processing circuitry associated with the requesting entity to cause the method 1100 to be executed). Reference is made to certain entities in the previous figures in the description of method 1100. The method 1100 may comprise or be implemented in conjunction with the method 700.

Where the request comprises an indication of a time of the request (e.g., the nonce as described above), in response to determining that the received message comprises the indication of the time of the request, the method 1100 comprises, at block 1102, verifying that the message was produced in response to the request. Thus, the requesting entity 112 may establish whether the message is freshly produced in response to the request (and may therefore be associated with the 'correct' request).

In some examples, any of the methods 800, 900, 1000, 1100 (as well as examples relating to the 'existence' of the message providing the evidence) may be combined with each other to facilitate 'indicating' that the apparatus 100, 334 produced the message and/or verifying that the message is associated with the 'correct' request. Further, any functionality mentioned in relation to the requesting entity 112, as referred to in the other examples described herein (e.g., relating to any of FIGS. 1 to 6), may be implemented by a method, machine-readable media and/or apparatus associated with the requesting entity 112.

Figure 12:
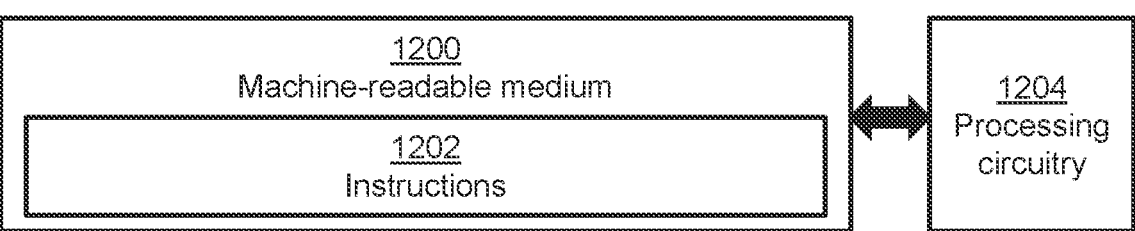
FIG. 12 is a simplified schematic drawing of an example machine-readable medium associated with certain methods, machine-readable media and apparatus described herein.

FIG. 12 schematically illustrates an example machine-readable medium 1200 (e.g., a non-transitory machine-readable medium) which stores instructions 1202 which, when executed by processing circuitry 1204 (e.g., a (e.g., at least one) processor), cause the processing circuitry 1204 to carry out certain methods described herein (e.g., methods 700, 800, 900, 1000, 1100 and/or related examples), implement examples relating to the architecture 200, implement examples relating to the system 300 and/or implement functionality of the apparatus 100, 334, 400, 500 (and/or related examples) and/or implement functionality of the machine-readable medium 600. In other words, any method or functionality implemented by any example described herein may be implemented by the instructions 1202. Thus, with the appropriate instructions, the machine-readable medium 1200 may implement the functionality of any of the entities such as referred to in FIGS. 1, 2 and 3.

Figure 13:
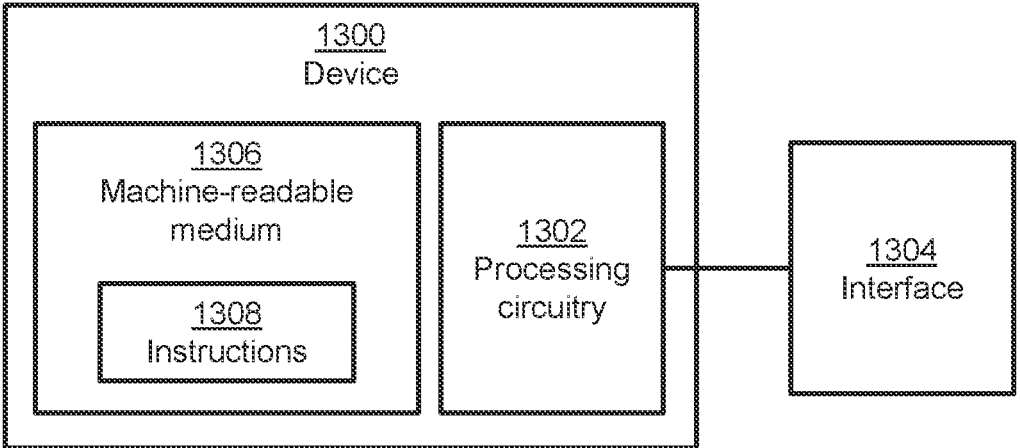
FIG. 13 is a simplified schematic drawing of an example device associated with certain methods, machine-readable media and apparatus described herein.

FIG. 13 is a schematic illustration of an example device 1300 for implementing or at least partially facilitating certain methods or machine-readable media described herein (e.g., certain blocks of methods 700, 800, 900, 1000, 1100 and/or related examples, certain instructions of apparatus 100, 334, 400, 500 (and/or related examples), certain instructions of machine-readable media 600 and/or certain functionality of the architecture 200, system 300 etc.). The device 1300 comprises processing circuitry 1302 communicatively coupled to an interface 1304 (e.g., implemented by a communication interface such as the communications interface 108 in the case of the apparatus 100 or another communications interface associated with the entity associated with the device 1300) for communicating with other entities such as referred to in FIGS. 1, 2 and 3. Thus, with the appropriate instructions, the device 1300 may implement the functionality of any of the entities such as referred to in FIGS. 1, 2 and 3.

Any of the blocks, nodes, instructions or modules described in relation to the figures may be combined with, implement the functionality of or replace any of the blocks, nodes, instructions or modules described in relation to any other of the figures. For example, methods may be implemented as machine-readable media or apparatus, machine-readable media may be implemented as methods or apparatus, and apparatus may be implemented as machine-readable media or methods. Further, any of the functionality described in relation to any one of a method, machine readable medium or apparatus described herein may be implemented in any other one of the method, machine readable medium or apparatus described herein. Any claims written in single dependent form may be re-written, where appropriate, in multiple dependency form since the various examples described herein may be combined with each other.

Examples in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus, functional nodes, modules or apparatus of the system and other devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. Apparatus comprising:
a processor associated with a secure interface of the apparatus for managing communications with a communications interface communicatively coupled to the secure interface via a communication path; and
a non-transitory machine-readable medium storing instructions readable and executable by the processor to cause the processor to:
wirelessly receive, via the secure interface, a request generated by a requesting entity for the apparatus to
provide information about a computing system hosted on the apparatus, the requesting entity separate from the computing system and wherein the requesting entity is a third-party remote administrator; and
in response to the request, produce a message comprising the information, where the message comprises an indication that the apparatus produced the message.

2. The apparatus of claim 1, where the apparatus is accessible to an operating system of the computing system, where the communication path is to permit sending and/or receiving of communications independently of the operating system.

3. The apparatus of claim 1, where, if the computing system is in a powered-down state, the apparatus is to access a power source to power-on the apparatus while the computing system is in the powered-down state and permit sending and/or receiving of communications via the communication path.

4. The apparatus of claim 1, where the instructions comprise further instructions to cause the processor to:
verify, using a public key associated with the requesting entity, whether the request was signed by the requesting entity; and
in response to verifying that the request was signed by the requesting entity, produce the message and/or cause the message to be sent via the communication path to the communications interface for sending to the requesting entity.

5. The apparatus of claim 1, where the indication comprises a signature applied, by the apparatus using a private key associated with the apparatus, to an output of the apparatus comprising the message.

6. The apparatus of claim 1, where the indication comprises at least part of the message encrypted using a key associated with the apparatus and/or the requesting entity.

7. The apparatus of claim 1, where the request is at least partially encrypted, the instructions comprise further instructions to cause the processor to decrypt the request using a key for decrypting the request.

8. A non-transitory machine readable medium storing instructions readable and executable by processor to cause the processor to:
produce a message comprising information about a computing system on a same platform as the processor, where the message is indicative that the processor produced the message; and
send the message, via a communication path that is independent of an operating system of the computing system, to a wireless communications interface connected to a remote requesting entity for communicating the message via a radio access network, wherein the remote requesting entity is a third-party remote administrator.

9. A method, comprising:
sending, by a remote requesting entity to an apparatus, a request for information about a computing system communicatively coupled to the apparatus for producing a message comprising the requested information, wherein the remote requesting entity is a third-party remote administrator;
receiving the message, sent from the apparatus via a communication path that is independent of an operating system of the computing system, where the message comprises evidence of an identity of the apparatus used to produce the message; and verifying, using processing circuitry, whether the identity of the apparatus used to produce the message is as expected based on the evidence.

10. The method of claim 9, where the evidence comprises a signature applied to the message by the apparatus, where the signature is indicative of the identity of the apparatus used to produce the message, the method comprising checking the evidence by using a public key associated with the identity of the apparatus to determine whether the apparatus produced the message.

11. The method of claim 9, where the evidence comprises at least partial encryption of the message using a public key associated with an identity of a requesting entity used to generate the request, the method comprising checking the evidence by successful decryption of the message using a private key associated with the identity of the requesting entity.

12. The method of claim 9, where the evidence comprises at least partial encryption of the message using a shared key associated with the apparatus used to produce the message and a requesting entity used to generate the request, the method comprising checking the evidence by successful decryption of the message using the shared key.

13. The method of claim 9, where the request is at least partially encrypted, and the evidence comprises existence of the received message indicating that the apparatus successfully decrypted the request.

14. The method of claim 13, where the request is at least partially encrypted using: a shared key associated with the apparatus and a requesting entity used to generate the request; or a public key associated with the identity of the apparatus.

15. The method of claim 9, where:

the request comprises an indication of a time of the request; and in response to determining that the received message comprises the indication of the time of the request, verifying that the message was produced in response to the request.

\* \* \* \* \*